United States Patent

[11] 3,630,847

[72] Inventors: Hans-Georg Rey;
Hans Wielinger; Peter Rieckmann, all of Mannheim-Waldhof, Germany
[21] Appl. No.: 745,358
[22] Filed: July 17, 1968
[45] Patented: Dec. 28, 1971
[73] Assignee: Boehringer Mannheim Gesellschaft mit beschraenkter Haftung
Mannheim-Waldhof, Germany
[32] Priority: July 20, 1967
[33] Germany
[31] B 93558

[54] DIAGNOSTIC AGENT FOR USE IN THE DETERMINATION OF HYDROPEROXIDES AND OF PEROXIDATE-ACTIVE SUBSTANCES
13 Claims, No Drawings

[52] U.S. Cl............................................ 195/103.5, 195/99, 260/296, 23/230, 252/408
[51] Int. Cl....................................... G01n 31/14
[50] Field of Search............................... 260/296; 23/230; 252/408; 195/103.5

[56] References Cited
UNITED STATES PATENTS
3,290,117 12/1966 Adams et al.................. 252/408
FOREIGN PATENTS
1,149,496 5/1963 Germany
OTHER REFERENCES
Colowick et al., Methods in Enzymology pp. 802– 803, Vol. II, 1955

Primary Examiner—A. Louis Monacell
Assistant Examiner—Max D. Hensley
Attorney—Burgess, Dinklage & Sprung ABSTRACT: Diagnostic agents suitable for use in carrying out rapid analytical determinations of the presence and/or concentration of hydroperoxide substances which react with the liberation of hydrogen peroxide, peroxidase and peroxidate active substances comprising an indicator, i.e., chromogen, which is oxidized by hydrogen peroxide, peroxidase or peroxidate active substances to form a dyestuff, the color intensity of which is dependent on the peroxide, peroxidase or peroxidate active substance present in the test sample, wherein the chromogen is a compound having the formula:

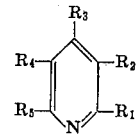

in which $R_1$ is hydroxyl, unsubstituted or substituted amino, wherein the substituent is an aliphatic, araliphatic, cycloaliphatic, heterocyclic or aromatic radical, which in turn is substituted by one or more of hydroxy, amino and alkoxy; $R_3$, $R_2$ and $R_5$ are each one of hydrogen, amino, hydroxy or alkoxy and $R_4$ is hydrogen or the substituent $R_1$.

The diagnostic agents can be used for analytical determinations involving, for example, glucose, galactose, amino acids, uric acid, peroxide, hemoglobin, peroxidase, etc. in samples, for example, constituting biological fluids such as blood, urine, spinal fluid, etc., milk, cosmetic and drug formulations, etc.

DIAGNOSTIC AGENT FOR USE IN THE DETERMINATION OF HYDROPEROXIDES AND OF PEROXIDATE-ACTIVE SUBSTANCES

This invention relates to diagnostic agents for use in carrying out rapid analytical determinations and to methods for manufacturing and using such agents.

More particularly this invention relates to diagnostic agents for use in the analytical determination of hydroperoxide and of substances from which hydrogen peroxide and other hydroperoxides can be liberated by a previous reaction, as well as for the determination of peroxidase and other peroxidate-active substances, such as horseradish and blood.

The detection of glucose in urine, blood and serum has, in the case of diabetes, acquired great importance as has also the detection of peroxidate-active substances, such as hemoglobin in urine and blood, and the detection of hydroperoxides in, for example, the milk industry, the cosmetics industry and in polymer chemistry.

A series of compounds are known which are oxidized to dyestuffs by means of hydrogen peroxide and peroxidase as catalyst. Compounds of this type include, for example, benzidine, o-dianisidine, o-tolidine and guaiacol. However, it has been established that some of these compounds are not very stable, and further according to very recent findings, that they can also be dangerous to the health of the personnel using them, so that their use does not appear to be free of danger.

In accordance with the invention, it has surprisingly been found that compounds having the following formula I possess excellent indicator properties and unlimited stability and are better suited for the determination of hydrogen peroxide, hydroperoxides, peroxidases and peroxidate-active substances than the aforesaid benzidine compounds effected by means of both colorimetry (optical tests) and with test papers and test films, the latter having been described, for example, in U.S. Pat. application Ser. No. 683,129.

The compounds of formula I have been found to be physiologically harmless and entirely reliable and are characterized by the following formula:

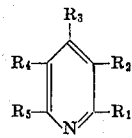

wherein $R_1$ is hydroxyl, unsubstituted or substituted amino wherein said substituent is an aliphatic, araliphatic, cycloaliphatic, heterocyclic or aromatic radical substituted by at least one of hydroxy, amino and alkoxy; $R_2$, $R_3$ and $R_5$, which may be the same or different, are each hydrogen, amino, hydroxy, or alkoxy; and $R_4$ is hydrogen or the substituent $R_1$.

It is known that compounds having the formula I as set out above, can be used to dye hair in an alkaline, preferably in an ammonia alkaline, medium when comparatively large amounts, i.e., 3–10 percent of hydrogen peroxide are present (see German Pat. specification Nos. 1,141,748; 1,142,045 and 1,149,496, and also Fette-Seifen-Anstrichmittel, 67, 222-227/1965.

However, it was not to have been foreseen that the compounds as characterized by formula I would also exhibit definite color reactions in a neutral to weakly acidic pH range in the presence of very small amounts of hydrogen peroxide (up to about 0.0005 percent) and of peroxidate-active substances, which color reactions can be employed as both a qualitative and quantitative indication of the presence of the particular substance. Furthermore, the sensitivity of the compounds having the formula I to hydrogen peroxide and to systems which liberate hydrogen peroxide is increased over a thousandfold when peroxidase is present. At the same time, the usual reaction times required in connection with hair dyeing amounting to about 10–30 minutes (in some cases, involving elevated temperatures of up to 60° C.) are, according to the present invention, shortened to 1 minute and less and this always at ambient temperature.

According to the present invention, there is also provided a process for the determination of hydroperoxides and of substances which react with the liberation of hydrogen peroxide, as well as of peroxidase and of peroxidate-active substances which is based on the reaction of a chromogen (formula I) and the hydroperoxide, peroxidase or peroxidate-active substances. The reaction is a so-called color reaction, the color produced serving to both qualitatively and quantitatively indicate the presence of the particular substance.

In the determinations, according to the invention, individual compounds (I), can be used, as well as mixtures thereof or with other dyestuff indicators, particularly good, relatively easily differentiated color shades thereby being obtained.

The evaluation of the coloration can be carried out, for example, by optical measurement using, for instance, a spectrophotometer or, when test paper strips and test films are involved, by comparison of the color intensity with standard color scales or standard comparison solutions.

The process according to the present invention can, of course, be used in procedures for the determination of the presence of chromogen of the formula I using therefor a hydroperoxide and a peroxidate-active substance. This process is very useful as a control measure in the production of the diagnostic agents.

The determination of the presence of hydroperoxides by the process according to the present invention is particularly useful for coupled and uncoupled enzyme reactions, as for example, for the determination of glucose, galactose, amino acids, uric acid, peroxides, hemoglobin, peroxidase or other peroxidate-active substances, as well as of enzyme activities. Because of their outstanding importance, the routine determination of substrates of this type is now an essential feature of clinical chemistry and of foodstuff chemistry.

In the case of the determination of glucose, the later is, for example, oxidized by glucose-oxidate to gluconic acid, atmospheric oxygen thereby being reduced to hydrogen peroxide. In the presence of peroxidase or of a peroxidate-active substance, the hydrogen peroxide then oxidizes the indicator or chromogen (formula I) used according to the present invention to produce the corresponding colored dyestuff.

Further examples of analytically useful enzyme systems of this type, which react with the liberation of hydrogen peroxide, include L-amino acid oxidase + L-amino acids, uricase + uric acid, xanthine oxidase + hypoxanthine or xanthine, glycine oxidase + glycine, monoamine oxidase + monoamine (such as adrenaline, mescaline and the like), diamine oxidase + diamine (such as histamine), luciferase + luciferin, D-aspartic acid oxidase + D-aspartic acid, liver aldehyde oxidase + aldehyde, galactose oxidase + galactose, Edson's flavine enzyme + lactic acid.

According to a further feature of the present invention, there is provided a diagnostic agent for the determination of hydroperoxides and of substances which react with the liberation of hydrogen peroxide, which comprises peroxidase or a peroxidate-active substance and a chromogen of the formula I.

According to yet another feature of the present invention, there is provided a diagnostic agent for the determination of hemoglobin and other peroxidate-active substances, which comprises hydrogen peroxide or a substance forming hydrogen peroxide and a chromogen having formula I.

It is to be understood that the new diagnostic agents according to the present invention can be prepared in the form of solutions in appropriate solvents, if necessary with the addition of conventional adjuvants, such as buffers. Alternatively, the new diagnostic agents can be prepared in the form of test papers by the impregnation of suitable adsorbent materials, such as filter paper, using solutions of the components of the diagnostic agents or they can be used for making reagent films, following the procedure, for example, described in U.S. Pat. application Ser. No. 683,129. Here again, in the case of such test papers and test films, it is frequently advantageous for the test papers and films to contain conventional adjuvants, such as buffers.

A more comprehensive understanding of the invention may be obtained by referring to the following illustrative examples, which are not intended, however, to be unduly limitative of the invention.

EXAMPLE 1

Detection of hydroperoxides in liquids

Fifty milligrams peroxidase were dissolved in 100 ml. of a 0.1M citrate or phosphate buffer having a pH of 5.6. A filter paper (Schleicher & Schüll No. 2316) was impregnated with the resulting solution. Thereafter, 300 mg. 2-phenylamino-5-amino-pyridine hydrochloride were dissolved in 100 ml. methanol and the same filter paper again impregnated with this solution. When strips of the thusly impregnated filter paper were dipped into solutions of hydrogen peroxide of various concentrations, the papers were colored dark wine red to dark blue-red, depending upon the concentration of the hydrogen peroxide present. Even with solutions containing as little as 5 γ/ml. hydrogen peroxide, there was still obtained a clear color reaction.

EXAMPLE 2

Detection of glucose in urine

One hundred milligrams glucose oxidase, 50 mg. peroxidase and 300 mg. 2-dimethylamino-5-aminopyridine dihydrochloride, were dissolved in 100 ml. of a 0.1M citrate or phosphate buffer having a pH of 5.6. A strip of filter paper (Schleicher & Schüll No. 2316) was then impregnated with this solution. When the thusly impregnated paper strip was dipped into glucose-containing urine, the paper took on a blue-violet shade, the depth of which depends upon the glucose concentration. A clear color reaction was observed even at a glucose concentration of 50 mg. percent.

EXAMPLE 3

Detection of glucose in blood

Ninety grams of aqueous polyvinyl propionate dispersion ("Propiofan"), 1.30 g. of the sodium salt of a polymannuronic acid ("Algipon"), 70 ml. of a 0.5M citrate or phosphate buffer, 2 g. of an organic sodium sulfonate ("Texapon P"), 320 mg. glucose oxidase, 300 mg. peroxidase and 600 mg. 2-cyclohexylamino-5-amino-pyridine in 20 ml. methanol, were stirred together to give a homogeneous mixture and this mixture then applied to a foil having a layer thickness of 300 μ. The foil was then dried. When a drop of blood was applied to a film produced in this manner and the blood removed after about 1 minute, the film had a reddish to brown-reddish color, depending upon the glucose concentration.

EXAMPLE 4

Detection of glucose in serum with an indicator mixture

Ninety grams polyvinyl propionate ("Propiofan"), 1.30 g. of the sodium salt of a polymannuronic acid ("Algipon"), 70 ml. of a 0.5M citrate or phosphate buffer, 2 g. of an organic sodium sulfonate ("Texapon P"), 320 mg. glucose oxidase, 300 mg. peroxidase and solutions of 300 mg. 2,3-diamino-pyridine hydrochloride and 300 mg. 2.6-diamino-pyridine hydrochloride each in 12 ml. water, were stirred together to provide a homogeneous mixture and the mixture then applied in a layer thickness of 300 μ to a foil which was then dried. When a drop of serum was applied to the film produced in this manner and the serum then removed after about 1 minute, the film was observed to have a green color, the intensity of which depends directly on the glucose concentration.

EXAMPLE 5

Detection of glucose in liquids

In the following table, there are summarized the color reactions and color shades which were produced by a number of further compounds of formula I with glucose (50 mg. percent and more), the test papers having been prepared in the manner described in example 2 and the test films in the manner described in example 3. For the spot reactions, there were used solutions analogous to that described in example 2. In the case of compounds which are not water soluble, there were used solutions in appropriate solvents or alternatively suspensions were used.

TABLE

| Compound (I) | Film | Paper | Drop plate |
| --- | --- | --- | --- |
| 2,3-diamino-pyridine | Grey-brown | Pink-brown | Red-brown. |
| 2,6-diamino-pyridine | Blue | Blue to grey-blue. | Blue. |
| 2,5-diamino-pyridine dihydrochloride | Yellowish-brown | Red-brown | Red-brown. |
| 2,6-dihydroxy-pyridinium hydrochloride | Pink-blue | Blue | Greenish. |
| 2-phenylamino-5-amino-pyridine hydrochloride | Carmine red | Wine red to dark blue. | Dark red. |
| 2-(β-hydroxyethylamino)-5-amino-pyridine hydrochloride | Brown | Red-brown | Red-brown. |
| 2-bis-(β-hydroxyethylamino)-5-amino-pyridine-hydrochloride | Brown | do | Do. |
| 2-cyclohexylamino-5-amino-pyridine | Pale brown | Brown-red | Orange. |
| 2-(γ-dimethylaminopropylamino)-5-amino-pyridine. | Brown | Orange | Do. |
| 2-dimethylamino-5-amino-pyridine dihydrochloride | Blue-violet | Blue | Blue-grey. |
| 5,5'-diamino-bis-(pyridyl-2)-amine | Red | Red | Red. |
| 2-(γ-methoxypropylamino)-5-amino-pyridine. | Reddish | Red-brown | Red-brown. |

EXAMPLE 6

Photometric detection of glucose

Sixteen milligrams glucose oxidase and 9 mg. peroxidase were dissolved in 10 ml. phosphate buffer having a pH of 6.0. One milligram of this solution, 1 ml. of an 0.0005M aqueous solution of 2,5-diamino-pyridine dihydrochloride and 1 ml. of the glucose solution to be investigated and having a physiologically interesting glucose concentration were pipetted, mixed together and then made up to 10 ml. with phosphate buffer (pH 6.0). The extinction of this solution in comparison with a blank was measured at 435 nm. and the glucose content calculated from a previously prepared calibration curve.

EXAMPLE 7

Detection of blood in urine

A filter paper (Schleicher & Schull No. 2312) was impregnated with an 0.1M aqueous solution of a phosphate buffer (pH 7.0) and then dried. Thereafter, the paper was impregnated with an 0.5 percent methanolic solution of 2-phenylamino-5-aminopyridine hydrochloride and again dried. When a drop of a blood-containing urine and a drop of a 3 percent hydrogen peroxide solution were applied to a strip of test paper prepared in this manner, then, even at a concentration of 1:100,000, the paper changed color from white to red-violet.

The products referred to in examples 3 and 4 designated inter alia by their trademarks are produced by the following manufactures:

| | | |
|---|---|---|
| "Algipon" | Henkel | Düsseldorf |
| "Propiofan" | BASF | Ludwigshafen |
| "Texapon P" | Dehydag | Düsseldorf |

We claim:

1. Diagnostic agent for use in the analytical determination of (a) hydroperoxide or a substance which reacts with the liberation of hydrogen peroxide, or (b) peroxidase or a peroxidatively active substance, which diagnostic agent comprises, in case *a* a chromogen and a member selected from the group consisting of peroxidase and peroxidatively active substances; and, in case *b*, a chromogen and a member selected from the group consisting of hydroperoxide or a substance which reacts with the liberation of hydroperoxide; said chromogen being a compound of the formula:

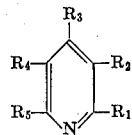

wherein $R_1$ is a member selected from the group consisting of hydroxy, unsubstituted and substituted amino wherein said substituent is a member selected from the group consisting of lower aliphatic, mono- and dihydroxy-substituted lower aliphatic, amino-substituted lower aliphatic and alkoxy-substituted lower aliphatic, cycloaliphatic amino pyridyl, pyridyl and phenyl radicals; $R_2$ is a member selected from the group consisting of hydrogen and amino, $R_3$ and $R_5$ are each a member selected from the group consisting of hydrogen, amino, hydroxy and lower alkoxy and $R_4$ is a member selected from the group consisting of hydrogen and the substituent $R_1$.

2. Diagnostic agent according to claim 1 for use in the determination of hydroperoxide or a substance which reacts with the liberation of hydrogen peroxide comprising a member selected from the group consisting of peroxidase and a peroxidate-active substance; and a chromogen as defined in claim 1.

3. Diagnostic agent according to claim 1 for use in the determination of peroxidate-active substances comprising a member selected from the group consisting of hydrogen peroxide and substances forming hydrogen peroxide; and a chromogen as defined in claim 1.

4. Diagnostic agent according to claim 1 in the form of a test paper impregnated with said diagnostic agent.

5. Diagnostic agent according to claim 1 in the form of a test film comprising said diagnostic agent.

6. Diagnostic agent according to claim 1 in the form of a solution thereof.

7. Process for making a diagnostic agent according to claim 1 for use in the determination of hydroperoxides in liquids which process comprises sequentially impregnating and then drying a filter paper strip with the following:
 1. a solution of peroxidase, buffered to a pH of 5.5–6, and
 2. a solution of 2-phenylamino-5-aminopyridine hydrochloride in a lower aliphatic alcohol.

8. Process for making a diagnostic agent according to claim 1 for use in the determination of glucose in urine which process comprises impregnating and drying a filter paper strip with the following:
 a solution of peroxidase, glucose oxidase and 2-dimethylamino-5-aminopyridine dihydrochloride.

9. Process for making a diagnostic agent according to claim 1 for use in the determination of glucose in blood which process comprises forming a mixture of an aqueous polyvinylpropionate dispersion, the sodium salt of polymannuronic acid, a citrate buffer, an organic sodium sulfonate, glucose oxidase, peroxidase and a solution of 2-cyclohexylamino-5-amino-pyridine in a lower aliphatic alcohol, thereby producing a test film.

10. Process for making a diagnostic agent according to claim 1 for use in the determination of glucose in serum which process comprises forming a mixture of polyvinyl propionate, a sodium salt of polymannuronic acid, a citrate buffer, an organic sodium sulfonate, glucose oxidase, peroxidase and aqueous solutions of 2,3-diamino-pyridine hydrochloride and 2,6-diamino-pyridine hydrochloride, thereby producing a test film.

11. Process for making a diagnostic agent according to claim 1 for use in the photometric determination of glucose which process comprises mixing a solution of glucose oxidase and peroxidase in a phosphate buffer with an aqueous solution of 2,5-diamino-pyridine dihydrochloride.

12. Process for making a diagnostic agent according to claim 1 for use in the determination of glucose in urine which process comprises sequentially impregnating and drying a filter paper strip with the following:
 1. an aqueous solution of phosphate buffer, and
 2. a lower aliphatic alcoholic solution of 2-phenyl-amino-5-aminopyridine hydrochloride.

13. Process for the analytical determination of (a) hydroperoxide or a substance which reacts with the liberation of hydrogen peroxide, or (b) a peroxidase or a peroxidatively active substance, which process comprises contacting a liquid containing the substance of interest with a diagnostic agent which comprises, in case *a*, a chromogen and a member selected from the group consisting of peroxidase and peroxidatively active substances, and, in case *b* a chromogen and a member selected from the group consisting of hydroperoxide or a substance which reacts with the liberation of hydroperoxide, said chromogen being a compound of the formula as set forth in claim 1, to produce a color with respect to said liquid as visual evidence of the presence of said substance of interest in said liquid.

* * * * *